US007958263B2

(12) United States Patent
Elliott et al.

(10) Patent No.: US 7,958,263 B2
(45) Date of Patent: Jun. 7, 2011

(54) ADDRESS REDUCTION FOR DATA STORAGE ENCLOSURES

(75) Inventors: John Charles Elliott, Tucson, AZ (US); Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 11/676,695

(22) Filed: Feb. 20, 2007

(65) Prior Publication Data

US 2008/0201725 A1    Aug. 21, 2008

(51) Int. Cl.
| G06F 15/16 | (2006.01) |
| G06F 15/177 | (2006.01) |
| G06F 12/00 | (2006.01) |
| G06F 12/06 | (2006.01) |
| G06F 13/00 | (2006.01) |
| H04L 12/26 | (2006.01) |
| H04L 12/28 | (2006.01) |
| H04L 12/66 | (2006.01) |
| H04B 10/00 | (2006.01) |
| G06F 12/02 | (2006.01) |
| G06F 12/08 | (2006.01) |

(52) U.S. Cl. ........ 709/245; 709/200; 709/201; 709/202; 709/220; 709/221; 709/222; 709/230; 709/231; 709/232; 370/252; 370/253; 370/254; 370/255; 370/256; 370/257; 370/258; 370/431; 370/463; 398/166; 711/1; 711/2; 711/3; 711/4; 711/5; 711/6; 719/326

(58) Field of Classification Search .................. 709/239, 709/200, 245, 250–252, 201–202, 220–222, 709/230–232; 710/15; 726/12; 398/2, 13, 398/113, 166; 711/1–6; 714/6–8, 5, 42; 370/252–258, 431, 463; 719/326
See application file for complete search history.

(56) References Cited

U.S. PATENT DOCUMENTS

| 5,812,754 | A | 9/1998 | Lui et al. ................. 395/182.04 |
| 6,256,740 | B1* | 7/2001 | Muller et al. .................... 726/12 |
| 6,470,026 | B1* | 10/2002 | Pearson et al. ................. 370/463 |
| 6,538,669 | B1 | 3/2003 | Lagueux, Jr. et al. ......... 345/764 |
| 6,625,747 | B1 | 9/2003 | Tawil et al. ....................... 714/6 |
| 6,643,795 | B1 | 11/2003 | Sicola et al. ..................... 714/6 |
| 6,725,293 | B1* | 4/2004 | Nakayama et al. ............. 710/36 |
| 6,895,461 | B1 | 5/2005 | Thompson ..................... 710/305 |
| 6,915,397 | B2 | 7/2005 | Lubbers et al. ............... 711/162 |
| 6,925,528 | B2 | 8/2005 | Selkirk et al. ................. 711/114 |
| 6,947,393 | B2* | 9/2005 | Hooper, III ................... 370/258 |
| 6,952,792 | B2* | 10/2005 | Emberty et al. .................. 714/5 |
| 6,996,741 | B1* | 2/2006 | Pittelkow et al. ................. 714/5 |
| 7,010,663 | B2 | 3/2006 | George et al. ................. 711/209 |

(Continued)

*Primary Examiner* — Nathan Flynn
*Assistant Examiner* — Kai J Chang
(74) *Attorney, Agent, or Firm* — John H. Holcombe

(57) ABSTRACT

A data storage enclosure management system of a plurality of service processors is configured to communicate externally via a pair of FC-AL loops. Lead and subsidiary service processors are defined and lead service processors connect to ones of the FC-AL loops with an FC-AL address, and the lead and subsidiary service processors are connected by a secondary communication link. The lead service processor(s) employ an identifier unassociated with the FC-AL address to differentiate communications of the lead service processor from communications of an associated subsidiary service processor, the lead service processor serving as a proxy for the associated subsidiary service processor with respect to the FC-AL address and communicating with the associated subsidiary service processor via the secondary communication link.

15 Claims, 5 Drawing Sheets

U.S. PATENT DOCUMENTS

| | | | |
|---|---|---|---|
| 7,013,380 B2 | 3/2006 | Matsui et al. | 711/209 |
| 7,024,410 B2 | 4/2006 | Ito et al. | 707/9 |
| 7,057,981 B2 | 6/2006 | Kano et al. | 369/30.28 |
| 7,069,354 B2 | 6/2006 | Pooni et al. | 710/38 |
| 7,082,462 B1 | 7/2006 | Matsunami et al. | 709/223 |
| 7,082,503 B2 | 7/2006 | Ito et al. | 711/152 |
| 7,099,962 B2 * | 8/2006 | Nakayama et al. | 710/36 |
| 7,404,104 B2 * | 7/2008 | Elliott et al. | 714/7 |
| 7,519,693 B2 * | 4/2009 | Bomhoff et al. | 709/220 |
| 2003/0061440 A1 * | 3/2003 | Elliott | 711/114 |
| 2003/0131182 A1 * | 7/2003 | Kumar et al. | 711/5 |
| 2003/0187847 A1 * | 10/2003 | Lubbers et al. | 707/9 |
| 2003/0189936 A1 * | 10/2003 | Terrell et al. | 370/395.31 |
| 2004/0153914 A1 * | 8/2004 | El-Batal | 714/724 |
| 2005/0047334 A1 * | 3/2005 | Paul et al. | 370/229 |
| 2006/0149881 A1 * | 7/2006 | Clayton et al. | 710/302 |
| 2007/0185924 A1 * | 8/2007 | Kawamura | 707/202 |
| 2007/0260915 A1 * | 11/2007 | Knapstad et al. | 714/6 |

* cited by examiner

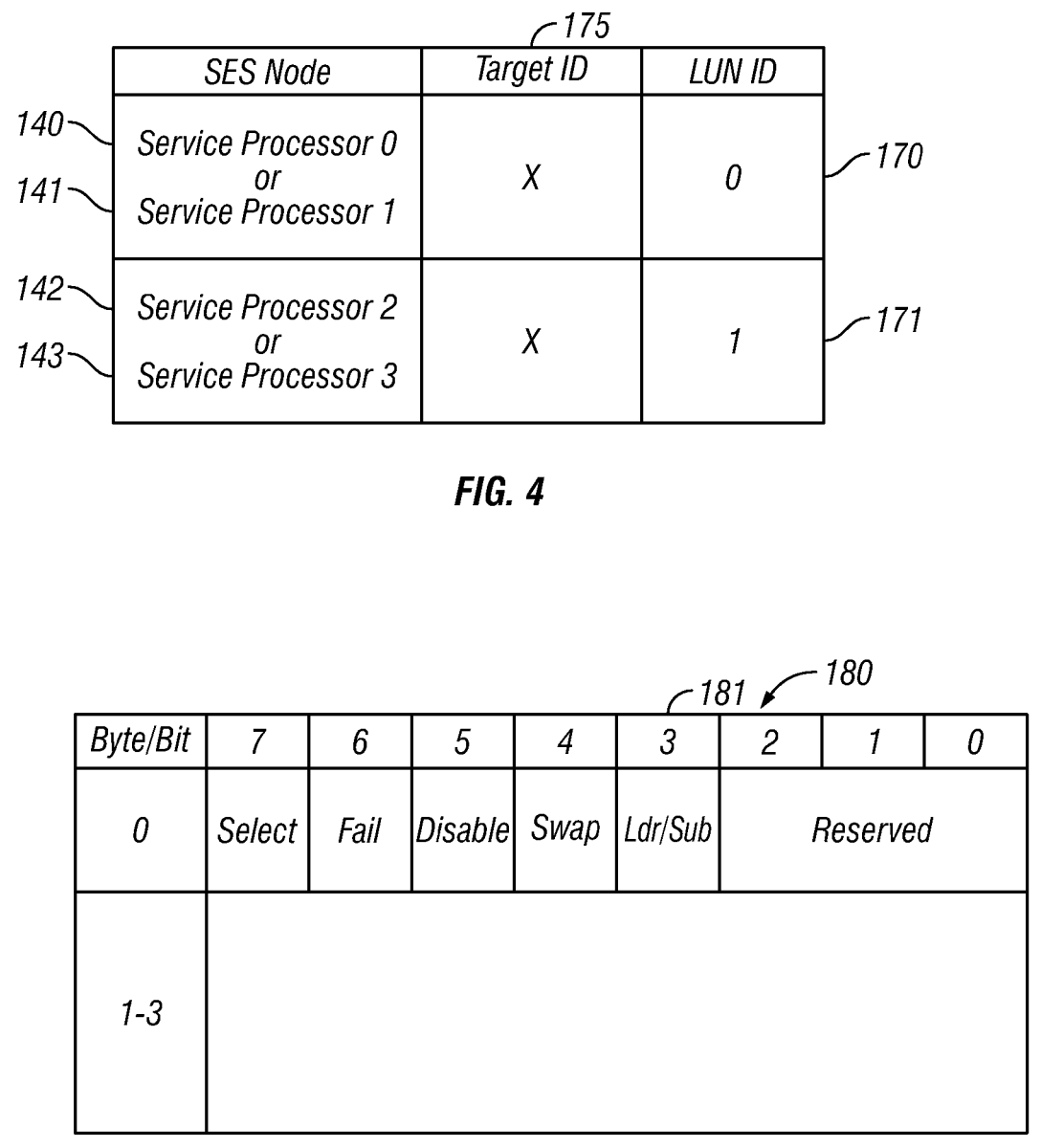

| SES Node | Target ID | LUN ID |
|---|---|---|
| Service Processor 0 or Service Processor 1 | X | 0 |
| Service Processor 2 or Service Processor 3 | X | 1 |

*FIG. 4*

| Byte/Bit | 7 | 6 | 5 | 4 | 3 | 2 | 1 | 0 |
|---|---|---|---|---|---|---|---|---|
| 0 | Select | Fail | Disable | Swap | Ldr/Sub | Reserved | | |
| 1-3 | | | | | | | | |

*FIG. 5*

ADDRESS REDUCTION FOR DATA STORAGE ENCLOSURES

FIELD OF THE INVENTION

This invention relates to data storage subsystems, and, more particularly, to addressing for external communications of data storage enclosures.

BACKGROUND OF THE INVENTION

Data storage subsystems provide a capability for storage of large amounts of data, for example, in data storage drives that are arranged in high densities in data storage enclosures. Those data storage drives are accompanied by environmental resources such as batteries, blowers, and power supplies. The various resources must be managed to operate effectively, typically employing communication separate from the data handling, and the management is typically conducted by a service processor. An example of a service processor is a SCSI enclosure service (SES) processor. Typically, a service processor reports to a data storage control system regarding the enclosure and/or components of the enclosure. Examples comprise the temperature at points in the enclosure, battery levels, whether some component has reached a critical point, such as internal temperature, etc. Multiple enclosures may be combined into a single data storage enclosure, for example, for increasing density, and the previously separate enclosures termed virtual enclosures. Service processors for the previously separate enclosures may be employed in each of the virtual enclosures with insubstantial changes to the applications of the service processors.

External communications with the data storage subsystems may be redundant, for example employing two FC-AL (Fibre Channel-Arbitrated Loop) loops connectable to each of the data storage drives, and/or to a plurality of storage controllers of the enclosure for data handling. In one example, each data storage drive comprises an "A" port and a "B" port, each of which may be connected to a different storage controller and to a different one of the FC-AL loops. The FC-AL loops may comprise switched loops, having an SBOD (switched bunch of disks) switch to address each of the nodes of the loop. As is known to those of skill in the art, a "switched" loop emulates a true serial loop.

External communications may be required both with respect to data handling, and with respect to the management of the enclosure. For example, an external data storage controller or host may need to know the present temperature status of a power supply of the enclosure to determine the extent of data handling that may be safely conducted. Hence, the service processors are also connected to the FC-AL loops.

FC-AL loops are limited in the number of allowable addresses, and a desire is to maximize the number of addresses to be employed for data handling.

SUMMARY OF THE INVENTION

Data storage enclosure management systems, data storage subsystems, methods and computer program products are configured to provide external communications with respect to a plurality of service processors of a data storage enclosure via a pair of FC-AL loops.

In one embodiment, a data storage enclosure management system is configured to communicate externally via a pair of FC-AL loops, and comprises at least one secondary communication link and a plurality of service processors. A first lead service processor is configured to connect to one of the pair of FC-AL loops with an FC-AL address, and to connect to a secondary communication link. A second lead service processor is configured to connect to the other of the pair of FC-AL loops with an FC-AL address, and to connect to a secondary communication link. At least one subsidiary service processor is configured to connect to at least one secondary communication link.

The lead service processor(s) additionally are configured to employ an identifier unassociated with the FC-AL address to differentiate communications of the lead service processor from communications of an associated subsidiary service processor, the lead service processor serving as a proxy for the associated subsidiary service processor with respect to the FC-AL address and communicating with the associated subsidiary service processor via the secondary communication link.

In another embodiment, the data storage enclosure management system is configured for a data storage system having a plurality of SBOD virtual enclosures, wherein the lead service processor(s) and the associated subsidiary service processor are each in different virtual enclosures.

In a further embodiment, the identifier comprises LUN (logical unit number) addresses.

In another embodiment, the identifier comprises assignments in control fields relating to the respective lead service processor and subsidiary service processor.

In a further embodiment, each of the service processors is configurable as a lead service processor, with FC-AL address capability and capability to serve as a proxy.

For a fuller understanding of the present invention, reference should be made to the following detailed description taken in conjunction with the accompanying drawings.

BRIEF DESCRIPTION OF THE DRAWINGS

FIG. 4 is a diagram of identifiers employed in accordance with an embodiment of the present invention;

FIG. 5 is a diagram of identifiers employed in accordance with another embodiment of the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
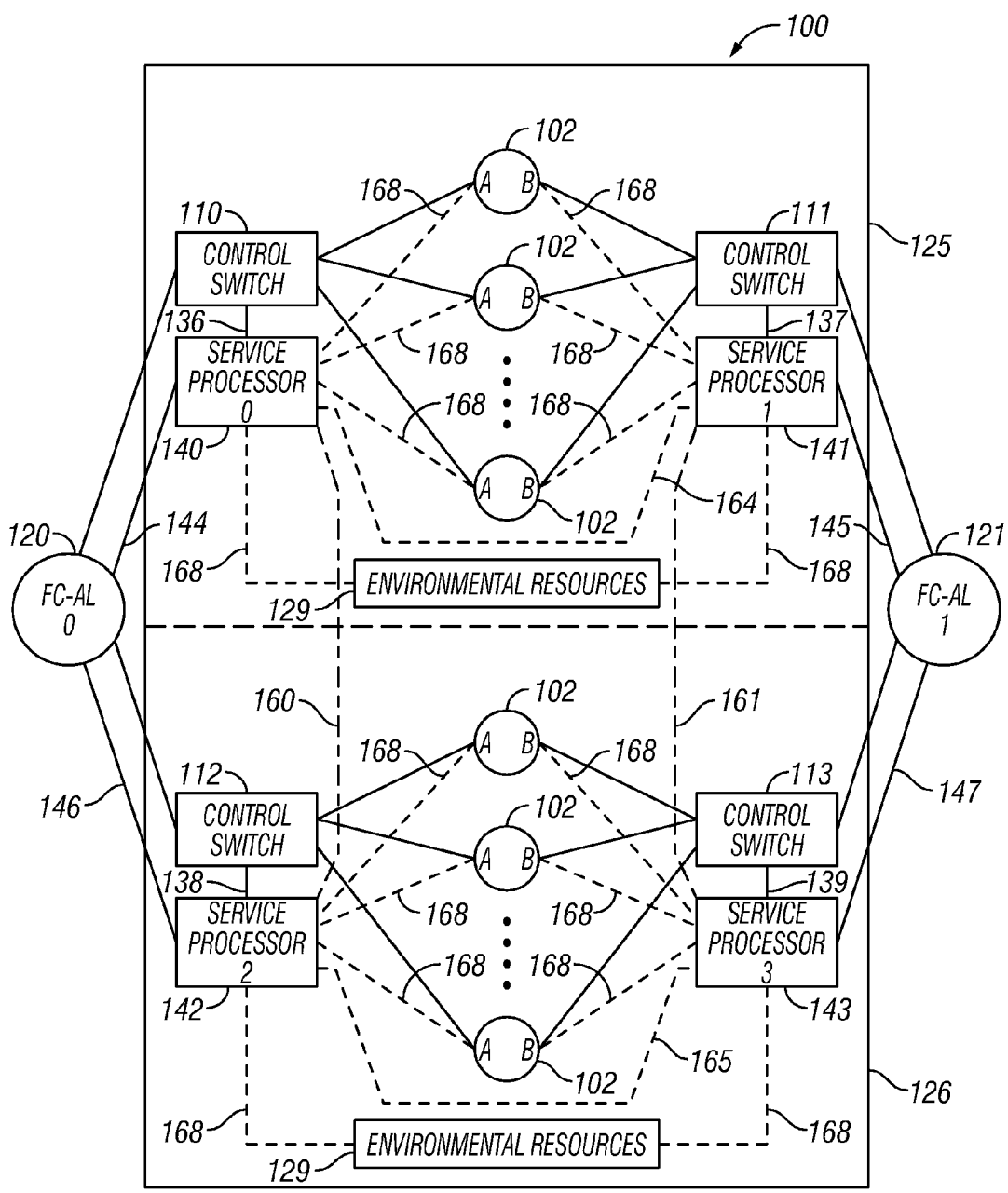
FIG. 1 is a block diagrammatic illustration of a data storage enclosure in accordance with the present invention.
Figure 2:
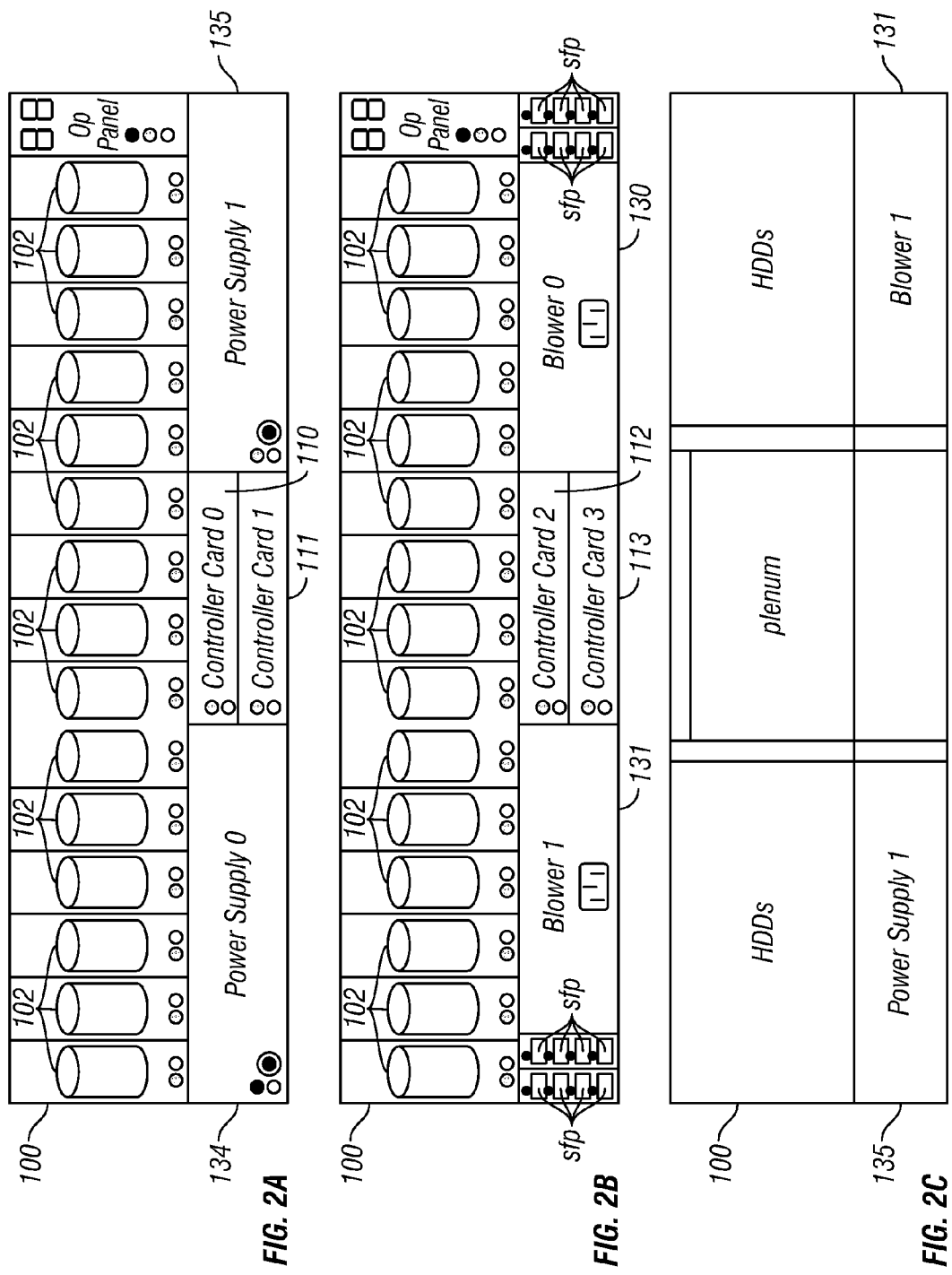
FIGS. 2A, 2B and 2C are diagrammatic illustrations of respectively the front, rear and right side views of the data storage enclosure of FIG. 1.
Figure 3:
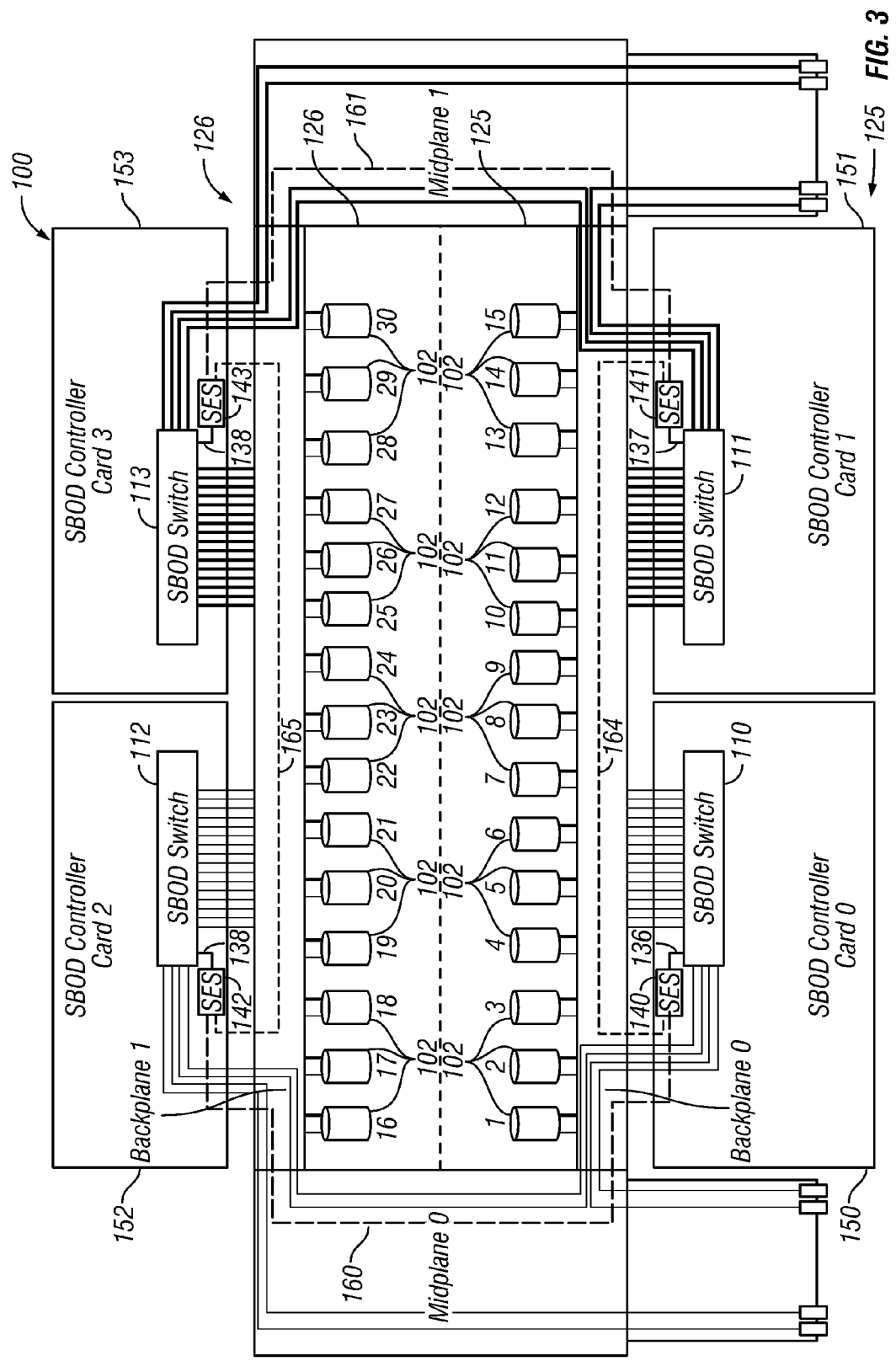
FIG. 3 is a detailed block diagrammatic illustration of the data storage enclosure of FIGS. 1, 2A, 2B and 2C.

Referring to FIGS. 1, 2A, 2B, 2C and 3, in one embodiment, a data storage enclosure 100 comprises data storage drives 102 for storing large amounts of data and which may comprise part of a data storage subsystem. The data storage drives typically comprises disk drives, for example, arranged to store data redundantly as a RAID (Redundant Array of Independent Disks) or not redundantly as a JBOD (Just a Bunch of Disks), where the redundancy is through a second set of disk drives. Other data storage drives may comprise optical disks or magnetic tape drives or other suitable devices. The data handling communications with respect to the data storage drives may be accomplished through control switches 110, 111, 112 and 113 and the external communications are accomplished by means of an external network or networks, also called a "fabric". External communications of the data storage subsystem may be redundant, for example employing two FC-AL loops 120, 121 connectable to each of the data storage drives, and/or via the storage controllers or control switches 110, 111, 112 and 113 of the enclosure. In one example, each data storage drive 102 comprises an "A" port and a "B" port, each of which may be connected to a different storage controller and to a different one of the FC-AL loops. The FC-AL loops may comprise switched loops, having an SBOD (switched bunch of disks) switch to address each of the nodes of the loop.

The data storage enclosure 100 may comprise multiple enclosures combined into a single data storage enclosure, for example, for increasing density, and the previously separate enclosures then termed virtual enclosures 125, 126.

The data storage drives 102 are accompanied by environmental resources 129 such as batteries, blowers 130, 131, and power supplies 134, 135. The various resources must be managed to operate effectively, typically separately from the data handling, and the management is typically conducted by service processors 140, 141, 142, 143. An example of a service processor is a SCSI enclosure service (SES) processor. If multiple enclosures are combined, service processors 140, 141, 142, 143 for the previously separate enclosures may be employed in each of the virtual enclosures with insubstantial changes to the applications of the service processors.

External communications may be required both with respect to data handling, and with respect to the management of the enclosure. For example, an external host may need to know the present temperature status of the enclosure, an environmental resource or of a drive, or have warning if a drive or enclosure is overheating, to determine the extent of data handling that may be safely conducted. Hence, the service processors are also connected to the FC-AL loops 120, 121.

The communication link or links forming potential connections of FC-AL loops 120, 121 to the service processors comprises communication link or links 144, 145, 146, 147, which are illustrated as SBOD arrangements. In an alternative arrangement, the service processors are connected to the FC-AL loops by communication link or links 136, 137, 138, 139 via the control switches 110, 111, 112 and 113 of the enclosure. Whether the communication link(s) are direct or indirect, an FC-AL loop requires an address for each node of the loop, including the "A" and "B" ports of the data storage drives 102. In one example, the FC-AL loops 120, 121 separately employ the same FC-AL address for each of the data storage drives, and are not active at the same time. In another example, each FC-AL loop is totally separate from the other and employs different addresses for each of the data storage drives.

In the illustrated embodiment, the service processors 140, 141, 142, 143 and the control switches 110, 111, 112 and 113 are mounted on the same controller cards 150, 151, 152, 153. Alternatively, the service processors are mounted on separate boards. Still alternatively, the service processors are separate applications operating in the same processor entity as the storage controllers or control switches.

The service processors 140, 141, 142, 143 comprise logic and/or one or more microprocessors with memory for storing information and program information for operating the microprocessor(s). Herein "processor" or "control" may comprise any suitable logic, programmable logic, microprocessor, and associated or internal memory for responding to program instructions, and the associated or internal memory may comprise fixed or rewritable memory or data storage devices. The program information may comprise a computer program product tangibly embodied on a computer useable medium, such as a host memory or a data storage drive or disk array, or by a floppy or optical disk, or by a cartridge, or other suitable medium, and be supplied to the service processors from the FC-AL network or by any other suitable means, and is configured to operate the service processors.

FC-AL loops are limited in the number of allowable addresses, and a desire is to maximize the number of addresses to be employed for data handling, comprising the ports of the data storage drives 102 and the control switches 110, 111, 112 and 113. In accordance with the present invention, not all of the potential connections to the service processors are addressed, saving addresses to be used instead for data handling.

In one embodiment, a data storage enclosure management system is configured to communicate externally via the FC-AL loops 120, 121. The system comprises at least one secondary communication link 160, 161 which interconnects the service processors 140 and 142, and the service processors 141 and 143. One service processor comprises a lead service processor and is configured to connect to one of the pair of FC-AL loops with an FC-AL address, and to connect to a secondary communication link. Another service processor is also a lead service processor and is configured to connect to the other of the pair of FC-AL loops with an FC-AL address, and to connect to a secondary communication link. At least one subsidiary service processor is configured to connect to at least one secondary communication link. In one embodiment, the lead service processors are predetermined and have the capability to serve as lead service processors, while the subsidiary processors do not. In another embodiment, one or more of the other service processors have the capability to become lead service processors, as will be discussed. In one example, service processors 140 and 141 are the lead service processors, and service processors 142 and 143 are the subsidiary processors.

The lead service processor(s) additionally are configured to employ an identifier unassociated with the FC-AL address to differentiate communications of the lead service processor 140, 141 from communications of an associated subsidiary service processor 142, 143, the lead service processor serving as a proxy for the associated subsidiary service processor with respect to the FC-AL address and communicating with the associated subsidiary service processor via the secondary communication link 160, 161.

Thus, only service processor 140 has an active FC-AL address for FC-AL loop 120, and only service processor 141 has an active FC-AL address for FC-AL loop 121, each reducing the number of service processor FC-AL addresses for the respective loop by one such that the unused address may be employed for data handling.

An additional secondary communication link 164, 165 may be provided to interconnect the service processors. The communication link may be the same link, or be identical or similar to the secondary communication link 160, 161.

The secondary communication links 160, 161, 164, 165 may comprise a network, a point-to-point system, or a combination. If a network, the communication links may comprise different paths of the same network.

As examples, the secondary communication links may comprise serial interfaces such as I2C (Inter-Integrated Connection), RS-232 (Recommended Standard), RS-422, CAN (Controller Area Network), USB (Universal Serial Bus), SAS (Serial Attached SCSI), IEEE 1394 (Institute of Electrical and Electronics Engineers), Ethernet, Fibre Channel, or any other serial interface as is known to those of skill in the art. Alternatively, the secondary communication links may comprise parallel interfaces such as SCSI (Small Computer Systems Interface), IEEE 1284, or any other parallel interface as is known to those of skill in the art.

The same, or identical or similar communication link or links 168 may be employed for communications between the service processors 140, 141, 142, 143 and the environmental resources 129 and data storage drives 102.

Still referring to FIGS. 1, 2A, 2B, 2C and 3, in one embodiment, the data storage enclosure management system is configured for a data storage system having a plurality of SBOD virtual enclosures 125, 126, wherein the lead service processor(s) and the associated subsidiary service processor are each in different virtual enclosures. For example, service processor 140 may comprise a lead service processor and service processor 142 a subsidiary service processor, and/or service processor 141 may comprise lead service processors and service processor 143 a subsidiary service processor, with service processors 140 and 141 in one virtual enclosure 125, and service processors 142 and 143 in another virtual enclosure 126. In one example, service processors 140 and 141 may communicate via communication link 164 to determine which service processor and its subsidiary will be active. Alternatively, the data storage control or host may determine which FC-AL loop will be active, thereby determining which control switch and which service processor will be active. Still alternatively, both may be active to provide continuous instant redundancy over either FC-AL loop.

In a further embodiment, each of the service processors is configurable as a lead service processor, with FC-AL address capability and capability to serve as a proxy. The service processors may communicate with each other and operate an algorithm to determine the lead and subsidiary processors, or the determination may be predetermined or preset, subject to change if one or a potential subsidiary processor has failed or is unavailable or unable to perform as a lead processor.

Referring additionally to FIG. 4, in a further embodiment, the identifier that is unassociated with the FC-AL address to differentiate communications of the lead service processor from communications of an associated subsidiary service processor comprises LUN (logical unit number) addresses 170, 171.

In the illustrated example, lead service processors 140 and/or 141 have an FC-AL address 175 (either both have addresses in either or both FC-AL loops or only one is active and has an active FC-AL address) and are differentiated from the corresponding subsidiary service processor(s) 142 and/or 143 by means of the different LUN addresses 170, 171. Thus, external communications targeting the subsidiary service processor will be decoded by the lead service processor and, based on the LUN address, if the subsidiary service processor is intended, will forward the communication to the subsidiary service processor over the secondary communication link. Conversely, communications targeting the lead service processor, based on the LUN address, will not be forwarded.

Further, communications by the subsidiary service processor may include the LUN address for identification and are made to the lead service processor over the secondary communication link, and the lead service processor is configured to forward the communications to the external system.

Referring additionally to FIG. 5, in another embodiment, the identifier comprises assignments in control fields 180 of command blocks, for example, employing otherwise reserved bits of the control field. In the example, byte 0, bit 3 181 identifies the respective lead service processor and subsidiary service processor. Thus, a bit "0" may indicate that the accompanying command is intended for the lead service processor, and a bit "1" may indicate that the accompanying command is intended for the subsidiary service processor.

Still alternatively, the status pages of the environmental resources and data storage drives and/or an algorithm to access the status pages may in themselves identify a service processor. Thus, the lead service processor is given the FC-AL loop address, and the specific status page that is appropriate to the specific environmental resource 129 or data storage drive 102 determines which service processor is intended in the communication.

Figure 6:
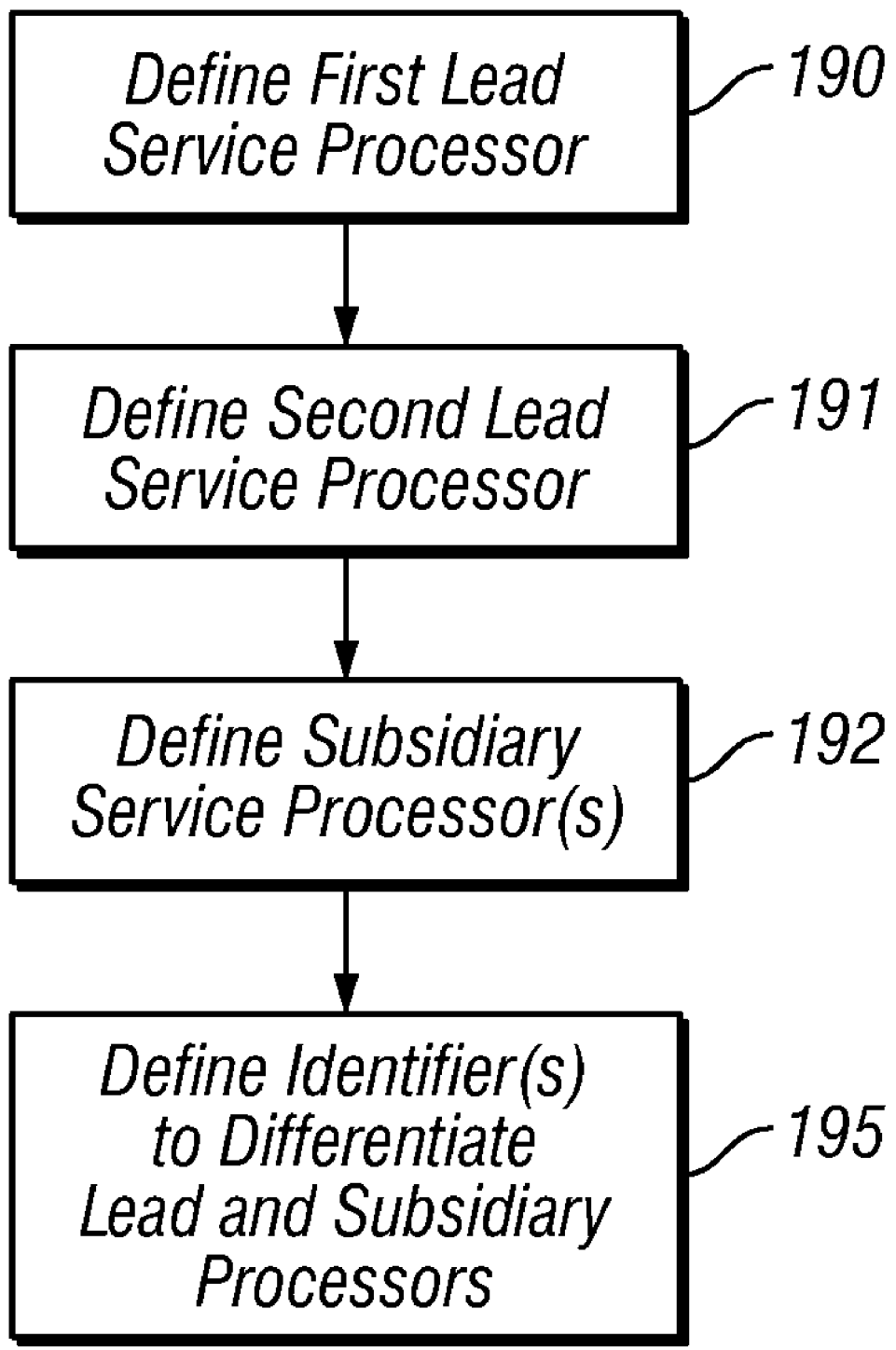
FIG. 6 is a flow chart depicting an embodiment of a method of the present invention.

Referring to FIGS. 1, 2A, 2B, 2C, 3 and 6, an embodiment of a method and of a computer program product for providing communications with respect to a pair of FC-AL loops and the service processors defines 190 one of the service processors 140, 141, 142, 143 as a first lead service processor configured to connect to one of the pair of FC-AL loops 120, 121 with an FC-AL address, and to connect to the secondary communication link 160, 161. In step 191, another of the plurality of service processors is defined as a second lead service processor configured to connect to the other of the pair of FC-AL loops with an FC-AL address, and to connect to at least one secondary communication link. In step 192, at least one of the remaining service processors is defined as a subsidiary service processor. Step 192 may not comprise a separate step, and is a direct result of steps 190 and 191.

In step 195, an identifier unassociated with the FC-AL address (such as LUN addresses 170 and 171 of FIG. 4 or assignments 181 in control fields 180 of FIG. 5) is defined to differentiate communications of the lead service processor from communications of an associated subsidiary of the plurality of service processors, the lead service processor serving as a proxy for the associated subsidiary service processor with respect to the FC-AL address and communicating with the associated subsidiary service processor via the secondary communication link 160, 161.

As discussed above, where the data storage enclosure comprises a plurality of SBOD virtual enclosures 125, 126, the lead service processor(s) and the associated subsidiary service processor(s) are each in different virtual enclosures.

Further, as discussed above, each of the service processors may be configurable as a lead service processor, with FC-AL address capability and capability to serve as a proxy, additionally comprising the step of selecting one of the service processors as the lead service processor as part of step 190 and as part of step 191.

At start-up, reset, or configuration, the data storage control or host will then determine the active FC-AL loop addresses for one or both FC-AL loops 120, 121, and as a result of the present invention, not all of the potential connections to the service processors are addressed, saving FC-AL loop addresses to be used instead for data handling.

Those of skill in the art will understand that changes may be made with respect to the operations discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data storage enclosure management system configured to communicate externally via a pair of Fiber Channel-Arbitrated Loop (FC-AL) loops, comprising:
   a plurality of secondary communication links; and
   a plurality of service processors, comprising:
      a first lead service processor to connect to one of said pair of FC-AL loops with an FC-AL address, and to connect to at least a first said secondary communication links;
      a second lead service processor to connect to the other of said pair of FC-AL loops with an FC-AL address, and to connect to at least a second said secondary communication link;
      a plurality of subsidiary service processors, a first subsidiary service processor to connect to at least said first secondary communication link, a second subsidiary service processor to connect to at least said second secondary communication link; and
   each of said lead service processors additionally to employ an identifier unassociated with said FC-AL address to differentiate communications of said lead service processor from communications of an associated subsidiary service processor, said lead service processor serving as a proxy for said associated subsidiary service processor with respect to said FC-AL address and communicating with said associated subsidiary service processor via a respective said secondary communication link, such that each said lead service processor has the active FC-AL address with respect to said connected FC-AL loop for said lead service processor and said associated subsidiary service processor.

2. The data storage enclosure management system of claim 1 for a data storage system having a plurality of virtual enclosures, wherein said lead service processors and said associated subsidiary service processor are each in different said virtual enclosures.

3. The data storage enclosure management system of claim 2, wherein said identifier comprises Logical Unit Number (LUN) addresses.

4. The data storage enclosure management system of claim 2, wherein said identifier comprises assignments in control fields relating to the respective said lead service processor and subsidiary service processor.

5. The data storage enclosure management system of claim 2, wherein each said service processor is configurable as a lead service processor, with FC-AL address capability and capability to serve as a proxy.

6. A data storage subsystem, comprising:
   an enclosure;
   a plurality of data storage drives within said enclosure and configured to connect to at least one of a pair of Fiber Channel-Arbitrated Loop (FC-AL) loops;
   environmental resources within said enclosure;
   a plurality of secondary communication links; and
   a plurality of service processors to manage said environmental resources, comprising:
      a first lead service processor to connect to one of said pair of FC-AL loops with an FC-AL address, and to connect to at least a first said secondary communication link;
      a second lead service processor to connect to the other of said pair of FC-AL loops with an FC-AL address, and to connect to at least a second said secondary communication link;
      a plurality of subsidiary service processors, a first subsidiary service processor to connect to at least said first secondary communication link, a second subsidiary service processor to connect to at least said second secondary communication link; and
      each of said lead service processors additionally to employ an identifier unassociated with said FC-AL address to differentiate communications of said lead service processor from communications of an associated subsidiary service processor, said lead service processor serving as a proxy for said associated subsidiary service processor with respect to said FC-AL address and communicating with said associated subsidiary service processor via a respective said secondary communication link, such that each said lead service processor has the active FC-AL address with respect to said connected FC-AL loop for said lead service processor and said associated subsidiary service processor.

7. The data storage subsystem of claim 6 wherein said enclosure comprises a plurality of virtual enclosures, and wherein said lead service processors and said associated subsidiary service processor are each in different said virtual enclosures.

8. The data storage subsystem of claim 7, wherein said identifier comprises Logical Unit Number (LUN) addresses.

9. The data storage subsystem of claim 7, wherein said identifier comprises assignments in control fields relating to the respective said lead service processor and subsidiary service processor.

10. The data storage subsystem of claim 7, wherein each said service processor is configurable as a lead service processor, with FC-AL address capability and capability to serve as a proxy.

11. A method for providing communications with respect to a pair of Fiber Channel-Arbitrated Loop (FC-AL) loops and a data storage enclosure comprising a plurality of service processors and a plurality of secondary communication links, comprising the steps of:
   defining one of said plurality of service processors as a first lead service processor to connect to one of said pair of FC-AL loops with an FC-AL address, and to connect to at least a first secondary communication link connected to an associated first of said service processors defined as a subsidiary service processor;
   defining another of said plurality of service processors as a second lead service processor to connect to the other of said pair of FC-AL loops with an FC-AL address, and to connect to at least a second said secondary communication link connected to an associated second of said service processors defined as a subsidiary service processor; and
   defining each of said lead service processors to employ an identifier unassociated with said FC-AL address to differentiate communications of said lead service processor from communications of said associated subsidiary service processor, said lead service processor serving as a proxy for said associated subsidiary service processor with respect to said FC-AL address and communicating with said associated subsidiary service processor via a respective said secondary communication link, such that each said lead service processor has the active FC-AL address with respect to said connected FC-AL loop for said lead service processor and said associated subsidiary service processor.

12. The method of claim 11, wherein said data storage enclosure comprises a plurality of virtual enclosures, wherein said lead service processor and said associated subsidiary service processor are each in different said virtual enclosures.

13. The method of claim 12, wherein said identifier comprises Logical Unit Number (LUN) addresses.

14. The method of claim 12, wherein said identifier comprises assignments in control fields relating to the respective said lead service processor and subsidiary service processor.

15. The method of claim 12, wherein each said service processor is configurable as a lead service processor, with FC-AL address capability and capability to serve as a proxy, additionally comprising the step of selecting one of said service processors as a lead service processor.

* * * * *